(12) United States Patent
Nakama (10) Patent No.: US 7,379,102 B2
(45) Date of Patent: May 27, 2008

(54) IMAGING APPARATUS WITH CONTROL UNIT THAT SWITCHES RECORDING MEDIUM FROM INTERNAL RECORDING MEDIUM TO AN EXTERNAL RECORDING MEDIUM

(75) Inventor: Satoshi Nakama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 589 days.

(21) Appl. No.: 10/726,603

(22) Filed: Dec. 4, 2003

(65) Prior Publication Data
US 2005/0036043 A1 Feb. 17, 2005

(30) Foreign Application Priority Data
Dec. 13, 2002 (JP) ............... 2002-362277

(51) Int. Cl.
*H04N 5/76* (2006.01)
(52) U.S. Cl. ............... 348/231.1; 348/333.01
(58) Field of Classification Search ........... 348/207.99, 348/231.1, 231.2, 231.99, 231.7, 333.01, 348/333.02, 211.99; 340/539.11; 715/748
See application file for complete search history.

(56) References Cited
U.S. PATENT DOCUMENTS

| | | | | |
|---|---|---|---|---|
| 5,806,005 A * | 9/1998 | Hull et al. | ... | 455/566 |
| 5,877,906 A * | 3/1999 | Nagasawa et al. | ... | 360/15 |
| 6,300,976 B1 * | 10/2001 | Fukuoka | ... | 348/231.99 |
| 6,337,712 B1 * | 1/2002 | Shiota et al. | ... | 348/231.1 |
| 6,864,918 B2 * | 3/2005 | Koide | ... | 348/231.1 |
| 6,930,601 B2 * | 8/2005 | Amram et al. | ... | 340/539.11 |
| 6,977,673 B1 * | 12/2005 | McKain et al. | ... | 348/207.99 |
| 7,165,224 B2 * | 1/2007 | Pyhalammi | ... | 715/748 |
| 2003/0202216 A1 | 10/2003 | Nakama et al. | ... | 358/302 |
| 2004/0267914 A1 * | 12/2004 | Roe et al. | ... | 709/222 |

FOREIGN PATENT DOCUMENTS
JP 2001-320659 11/2001

OTHER PUBLICATIONS

UPnP (Universal Plug and Play) Device Architecture, Version 1.0, (Jun. 8, 2000).
Mar. 27, 2007 Japanese Official Action in Japanese Patent Appln. No. 2002-362277 (with translation).

* cited by examiner

*Primary Examiner*—Tuan V Ho
(74) *Attorney, Agent, or Firm*—Fitzpatrick, Cella, Harper & Scinto (57) ABSTRACT

An imaging apparatus includes a recording unit, a first detecting unit, a second detecting unit, and a control unit. The recording unit records taken images on a first recording medium. The first detecting unit detects the remaining available recording space of the first recording medium. The second detecting unit detects a plurality of external recording devices from a network. The control unit (a) determines a priority among the plurality of external recording devices, (b) automatically selects one of the plurality of external recording devices in accordance with the determined priority among the plurality of external recording devices, and ©) changes a recording medium for the taken images from the first recording medium to the selected external recording device so that the selected external recording device records the taken images on a second recording medium.

7 Claims, 7 Drawing Sheets

| PRIORITY | UDN | SPACE AVAILABLE FOR RECORDING | RESPONSE TIME FOR START OF RECORDING | TYPE OF DEVICE |
|---|---|---|---|---|
| 1 | uuid:49269dc8-49f5-41a1-80ee-d4ffd9d8636c | 200 | 3 | AVHDD |
| 2 | uuid:3f7bv3e3-2253-4f0a-b9b4-88f02d47eeee | 120 | 5 | AVHDD |
| 3 | uuid:ac0ac313-f117-4ec5-8dfd-e158cb82f647 | 60 | 3 | Camcorder |

IMAGING APPARATUS WITH CONTROL UNIT THAT SWITCHES RECORDING MEDIUM FROM INTERNAL RECORDING MEDIUM TO AN EXTERNAL RECORDING MEDIUM

BACKGROUND OF THE INVENTION

1. Field of the Invention

The present invention relates to an imaging apparatus such as a digital video camera or the like.

2. Description of the Related Art

Images taken by conventional imaging apparatuses (digital video camera or the like) can be recorded on an internal recording medium such as a videotape.

However, such conventional imaging apparatuses have the disadvantage that the user is required to keep in mind the remaining tape length of the internal recording medium thereof at all times, and further have the disadvantage that there is the need to stop recording of images during replacement of a videotape or the like.

Furthermore, there is the need to perform switching for recording of images, in a manual mode according to the decision of the user, even in the event that the imaging apparatus is connected externally through a network, leading to troublesome operations for the user, and further leading to a problem that image-taking quality might be adversely affected due to the user being distracted by such a troublesome switching operation.

As described above, the conventional imaging apparatuses have a problem that in the event that the images cannot be recorded on an internal recording medium during image taking, it is difficult to continuously record the taken images.

SUMMARY OF THE INVENTION

An object of the present invention is to overcome the above-described drawbacks. It is another object of the present invention to provide an imaging apparatus wherein the recording medium for recording taken images can be easily switched from an internal recording medium included in the imaging apparatus to a recording medium included in an external recording device.

An imaging apparatus for recording taken images on an internal recording medium according to a preferred embodiment of the present invention comprises: a first detecting unit for detecting the remaining available recording space of the internal recording medium; a second detecting unit for detecting external recording devices communicably connected through a network in the event that the remaining available recording space of the internal recording medium reaches a predetermined value; and a control unit for automatically performing switching of the recording medium for recording the taken images from the internal recording medium to a recording medium included in the external recording device detected by the second detecting unit.

Further objects, features and advantages of the present invention will become apparent from the following description of the preferred embodiments with reference to the attached drawings.

DESCRIPTION OF THE PREFERRED EMBODIMENTS

First Embodiment

Figure 1:
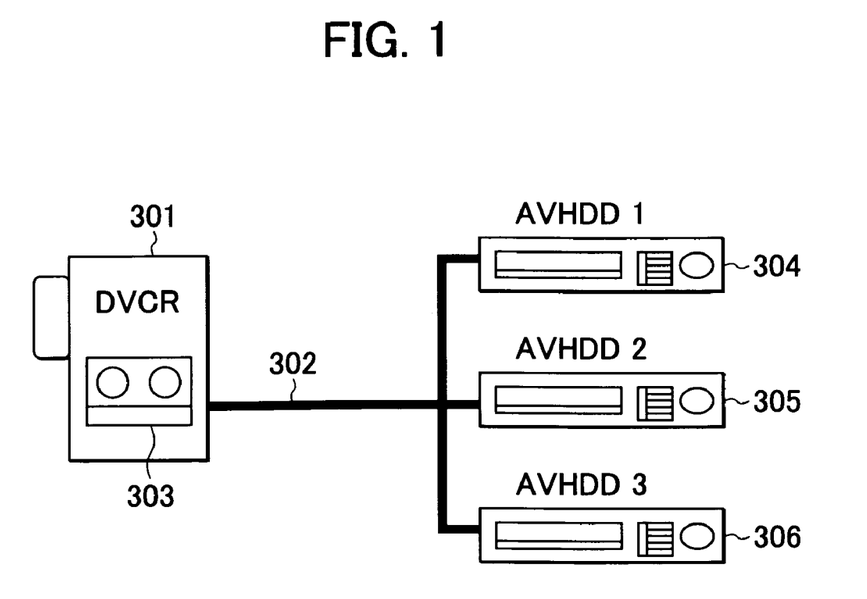
FIG. 1 is a diagram which illustrates an example of a network configuration according to a first embodiment.

Description will be made regarding a first embodiment according to the present invention with reference to the drawings. FIG. 1 is a network configuration diagram according to the first embodiment. Note that a network shown in FIG. 1 is stipulated by UPnP (Universal Plug and Play) (reference: Universal Plug and Play Device Architecture, Version 1.0, 08 Jun. 2000).

In FIG. 1, reference numeral 301 denotes a DVC (Digital Video Camera). Reference numeral 302 denotes an IEEE 1394 cable serving as a digital interface. Reference numeral 303 denotes an internal tape. Reference numeral 304 denotes a first AVHDD (Hard Disk, AVHDD 1), 305 denotes a second AVHDD (Hard Disk, AVHDD 2), and 306 denotes a third AVHDD (Hard Disk, AVHDD 3). Note that the first through third AVHDDs 304 through 306 will be referred to as "external recording devices" hereafter.

As shown in FIG. 1, the DVC 301 is connected to the first through third AVHDDs 304 through 306 via the IEEE 1394 cable 302, thereby enabling mutual input/output of images.

The DVC 301 has an internal tape 303 serving as an internal recording medium. In general, images are taken from a lens provided to the DVC 301, are converted into image data in the DV format, and are recorded on the internal tape 303.

Figure 2:
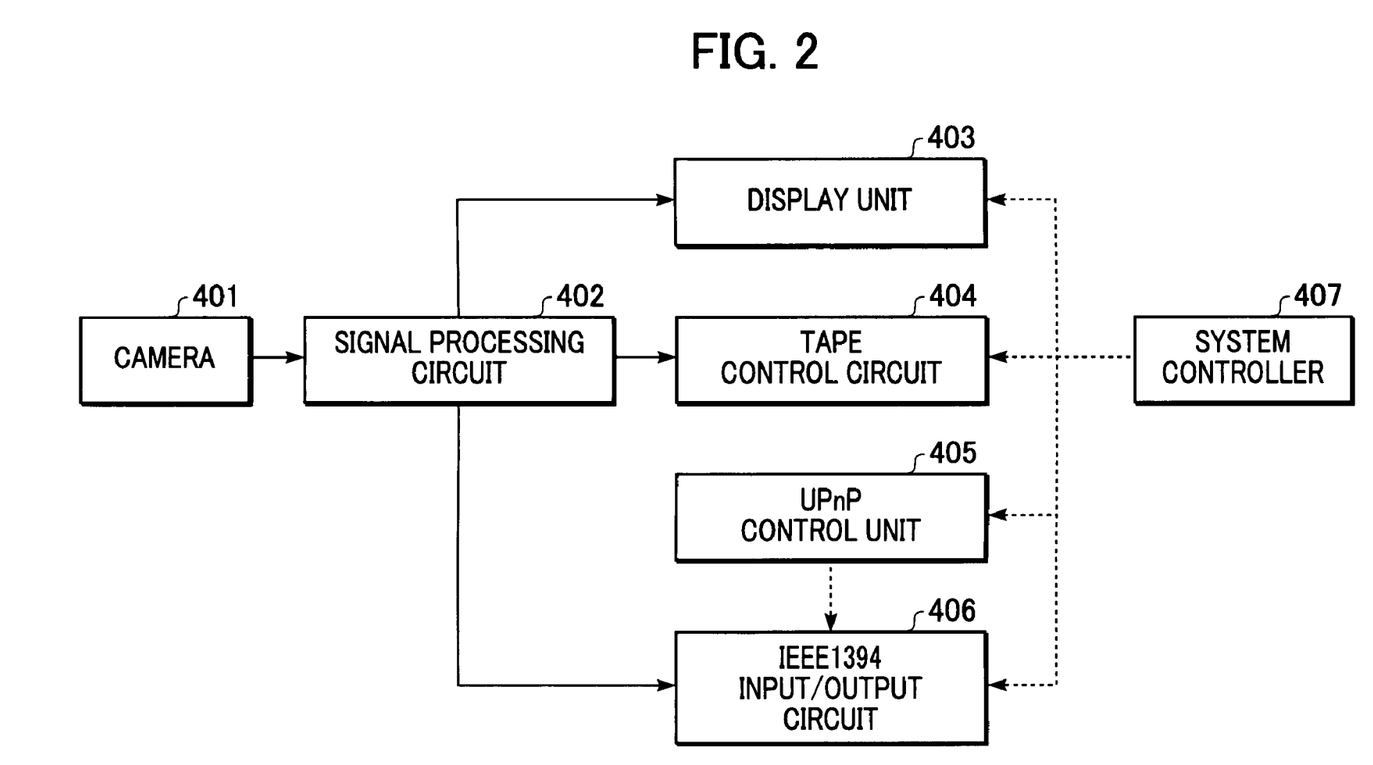
FIG. 2 is a block diagram which shows an example of the internal configuration of a DVC serving as an imaging apparatus according to the first embodiment.

FIG. 2 is a block diagram which shows the internal configuration of the DVC 301. In FIG. 2, reference numeral 401 denotes a camera, 402 denotes a signal processing circuit, 403 denotes a display unit, 404 denotes a tape control circuit, 405 denotes a UPnP control unit, 406 denotes an IEEE 1394 input/output circuit, and 407 denotes a system controller. Note that solid lines show signal flow and broken lines show data flow in FIG. 2.

While it is needless to say that DVC 301 includes an audio circuit so as to record audio, description of the audio circuit will be omitted for simplification in the first embodiment. Note that it is needless to say that the audio circuit performs the same processing as with the video circuit.

The images taken by the camera 401 are converted into image data in a predetermined format for recording on the internal tape 303 by the signal processing circuit 402, and are transmitted to the tape control circuit 404. Furthermore, the images taken by the camera 401 are transmitted to the display unit 403 and the IEEE 1394 input/output circuit 406, as well. Note that the images taken by the aforementioned camera 401 will be referred to as "taken image" hereafter.

The user can record desired images while observing taken images displayed on the display unit 403. Upon the user starting recording of the taken images, the information is transmitted to the system controller 407. The system controller 407 commands the tape control circuit 404 to record the taken images on the internal tape 303.

The tape control circuit 404 performs joining processing such as timecode processing, and servo processing, so as to perform recording in a suitable format, and so as to perform processing for correctly recording the taken image on the internal tape 303.

Furthermore, the tape control circuit 404 reads out the information with regard to the current recording position (current position on the tape for recording) as to the entire space of the internal tape 303 in order to obtain the information with regard to the remaining tape length of the internal tape 303, and transmits the information to the system controller 407.

The system controller 407 calculates the remaining available recording time based upon the received information with regard to the current recording position on the tape, and displays the calculated remaining recording time on the display unit 403. Note that the system controller 407 displays the aforementioned remaining recording time in a user-friendly format.

Furthermore, the tape control circuit 404 controls a detecting circuit for detecting an abnormal state of the internal tape 303 which is referred to as "jamming", and detecting the presence or absence of the internal tape 303. In the event that the abnormal state of the internal tape 303 is detected, the information is transmitted to the system controller 407 with the highest priority.

Now, description will be made regarding an example of the principal process for switching the recording medium for recording the taken images from the internal tape 303 to an external recording device, with reference to the flowchart shown in FIG. 3.

First, the tape control circuit 404 confirms the presence of the internal tape 303 (Step S1), following which the tape control circuit 404 further confirms whether or not the internal tape 303 is available for recording images (Step S2).

In the event that the internal tape 303 is available for recording, the tape control circuit 404 displays the information with regard to the internal tape 303 on the display unit 403, and records the taken images on the internal tape 303 (Step S3).

On the other hand, in the event of absence of the internal tape 303 (Step S1), the tape control circuit 404 transmits the information regarding the absence of the internal tape 303 to the display unit 403 (Step S4).

Furthermore, in the event that the internal tape 303 is not available for recording image data, a recording-image flag for starting recording images on an external recording device is set to on (Step S5).

Subsequently, the system controller 407 commands the UPnP control unit 405 to issue a command for searching for external recording devices connected within the network (Step S6).

In the event of detecting the devices available as an external recording device as a result of detection by the UPnP control unit 405, the UPnP control unit 405 transmits this information to the system controller 407 (Step S7).

The system controller 407 sends query commands for the remaining available recording space of external recording devices to the UPnP control unit 405 in the order of detection.

The UPnP control unit 405 issues a command for detecting the aforementioned external recording device so as to measure the time period from issuing of the command up to reception of the response (response time). The UPnP control unit 405 transmits the information with regard to the measured time period and the available recording space of the aforementioned external recording device to the system controller 407 (Steps S8 and S9).

The system controller 407 determines the optimal external recording device based upon the above-described notified information regarding the response time and available recording space of the aforementioned external recording device, and stores the order of priority of the external recording devices for performing recording of taken images (Step S10).

In the event that the recording flag for recording on the external recording device is on (Step S11), the system controller 407 issues a recording command for the UPnP control unit 405 so that the external recording device can immediately starts recording of the taken images (Step S12).

In the event that there are no corresponding available external recording devices in the network (Step S7), the system controller 407 notifies the display unit 403 that there are no devices available for recording the taken images in the UPnP network (Step S13), and sets the recording flag for recording on the external recording device to off (Step S14). Furthermore, the system controller 407 cancels the recording-start request specified by the user, and notifies the display unit 403 that recording cannot be made.

Next, description will be made regarding a specific process for determining the order of the external recording devices for recording (the process for determining the order of priority of the external recording devices for recording the taken image in Step S10 shown in FIG. 3), with reference to the flowchart shown in FIG. 4.

First, the system controller 407 makes a comparison between the response time periods from external recording devices, as well as making a comparison between the remaining available recording spaces thereof, and determines the optimal device based upon the comparison results (Step S21).

In the event that a recording request for the taken images is made without an available internal recording medium such as the internal tape 303 or the like (Step S22), there is the need to immediately start recording, and accordingly, the system controller 407 determines the priority of the external recording devices in the order of the smallest response time therefrom (Steps S23 through S25).

On the other hand, in the event that the taken images are being recorded at that very time (Step S22), the system controller 407 determines the priorities of the external recording devices in the order of the greatest remaining available recording space thereof in order to reduce the number of times of switching of recording medium of taken images (Steps S24 through S28).

The system controller 407 has a table for the external recording devices with the priorities thereof. Furthermore, the system controller 407 adds new external recording devices, which have been just added to the UPnP network, to the group which is to be subjected to comparison processing for determining the priorities based upon the information obtained from the UPnP control unit 405.

Accordingly, in the event that a new external recording device has been added on the network, the system controller 407 sends a query command to the aforementioned new added external recording device so as to obtain the above-described information regarding the response time therefrom and the remaining available recording space thereof. Subsequently, the system controller 407 appends the above-described information to a new table without including the external recording device which is currently being used for recording.

Figure 5:
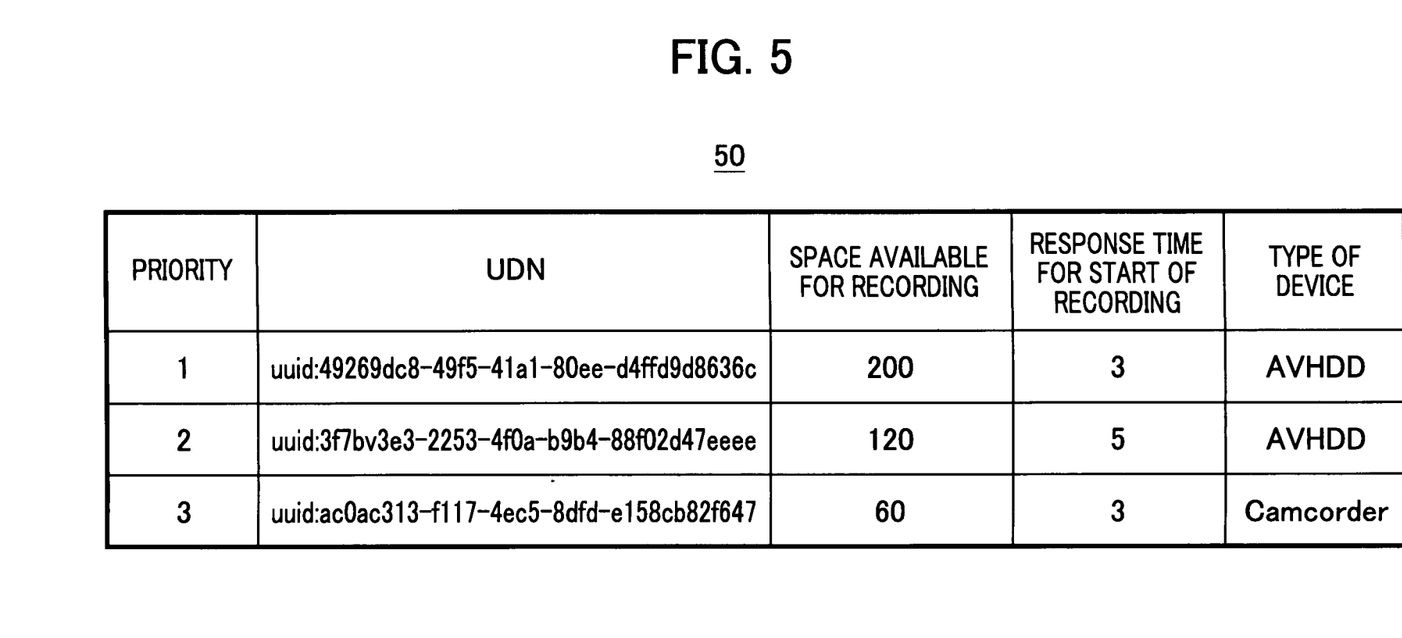
FIG. 5 is a diagram which shows an example of a table for registering the order of the external recording devices for recording.

It is needless to say that in the event that any external recording device is disconnected from the UPnP network, the information regarding the external recording device is deleted from the table included in the system controller 407, whereby the aforementioned table is updated. FIG. 5 shows an example of the table for storing the order of the external recording devices for recording.

Figure 3:
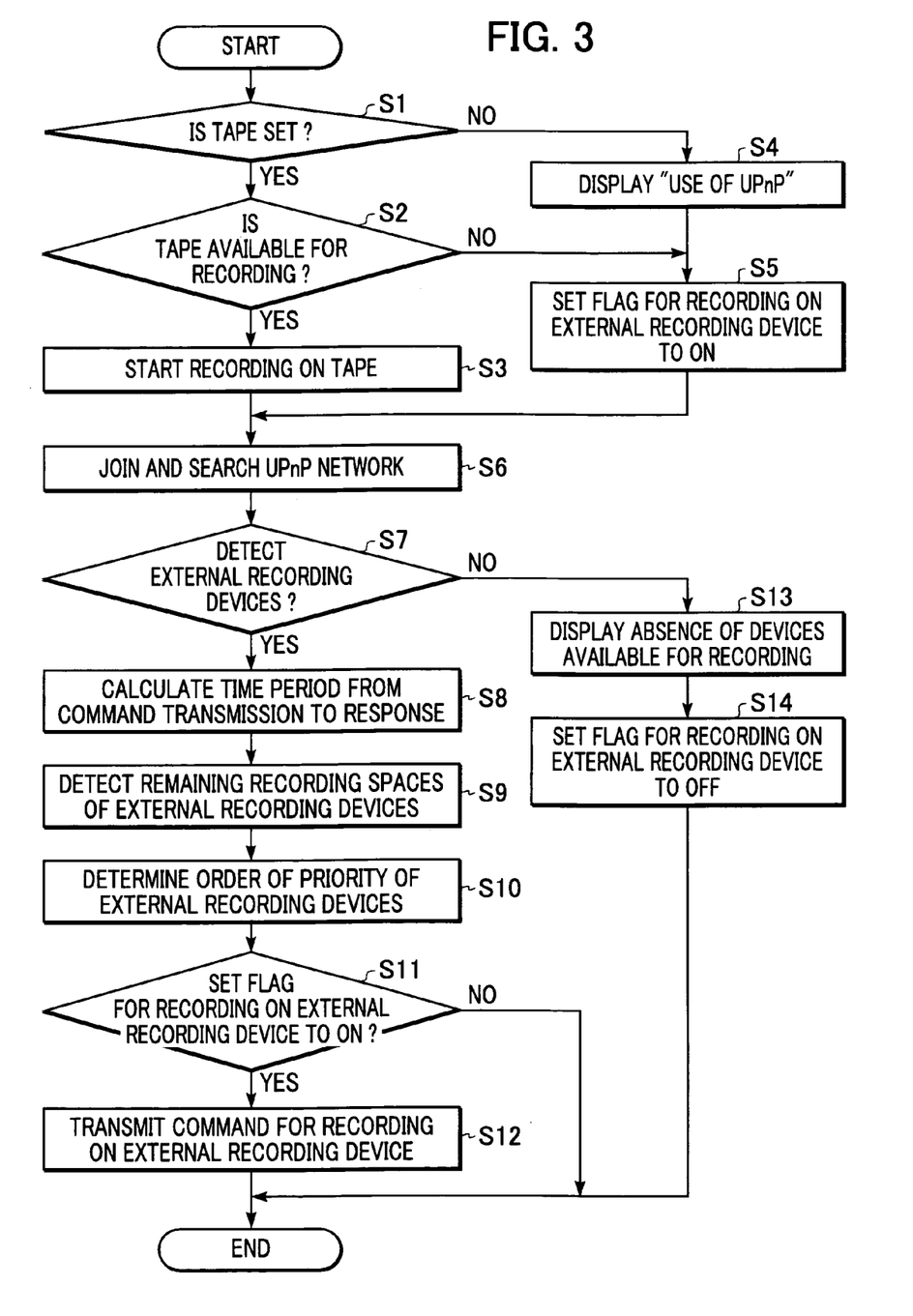
FIG. 3 is a flowchart for describing an example of principal processing for switching of the recording medium for recording taken images from an internal recording medium to a recording medium in an external recording device.
Figure 4:
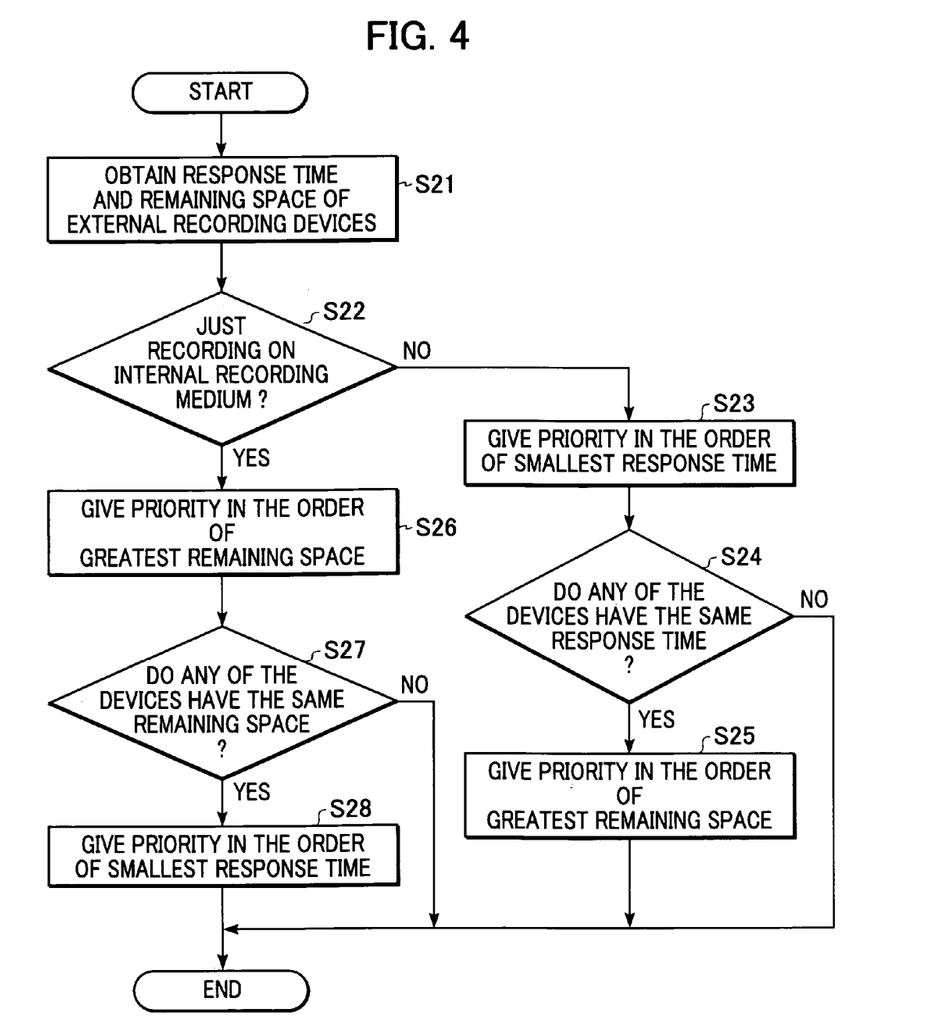
FIG. 4 is a flowchart for describing an example of processing for determining an external recording device for recording the taken images.

In the event that internal tape 303 is available for recording the taken image, immediately following a recording start request from the user, recording is started on the internal tape 303 in a suitable format (Steps S2 and S3 in FIG. 3).

Note that the search is performed for the external recording devices on the aforementioned UPnP network while recording the taken images on the internal tape 303. Thus, the system controller 407 builds a table 50 regarding the external recording devices with priorities based upon the above-described search results.

As described above, the system controller 407 calculates the aforementioned remaining available recording time based upon the aforementioned tape position detected by the tape control circuit 404. Subsequently, the system controller 407 makes a comparison between the calculated remaining available recording time and the response time of the external recording device required for the start of recording. The response time periods of the external recording devices required for the start of recording are registered in the table 50 regarding the external recording devices with the priorities thereof shown in FIG. 5 (the "response time for start of recording" in FIG. 5).

Description will be made below regarding a specific process for switching from recording the taken images on the internal tape 303 to recording the taken images on an external recording device, with reference to the timechart shown in FIG. 6 and the flowchart shown in FIG. 7.

Figure 6:
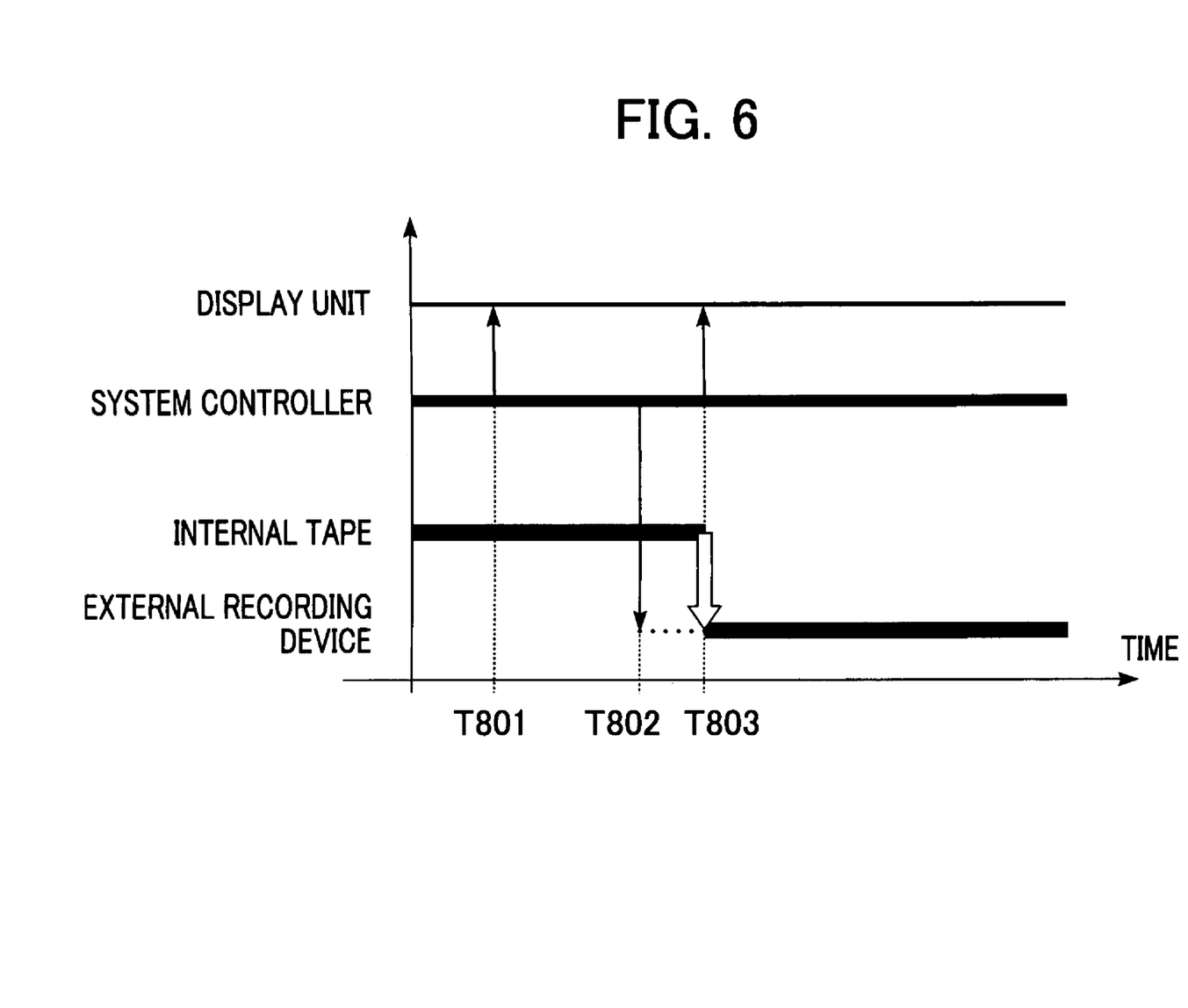
FIG. 6 is a timechart for describing specific processing for switching of the recording medium from the internal recording medium to the recording medium included in the external recording device.
Figure 7:
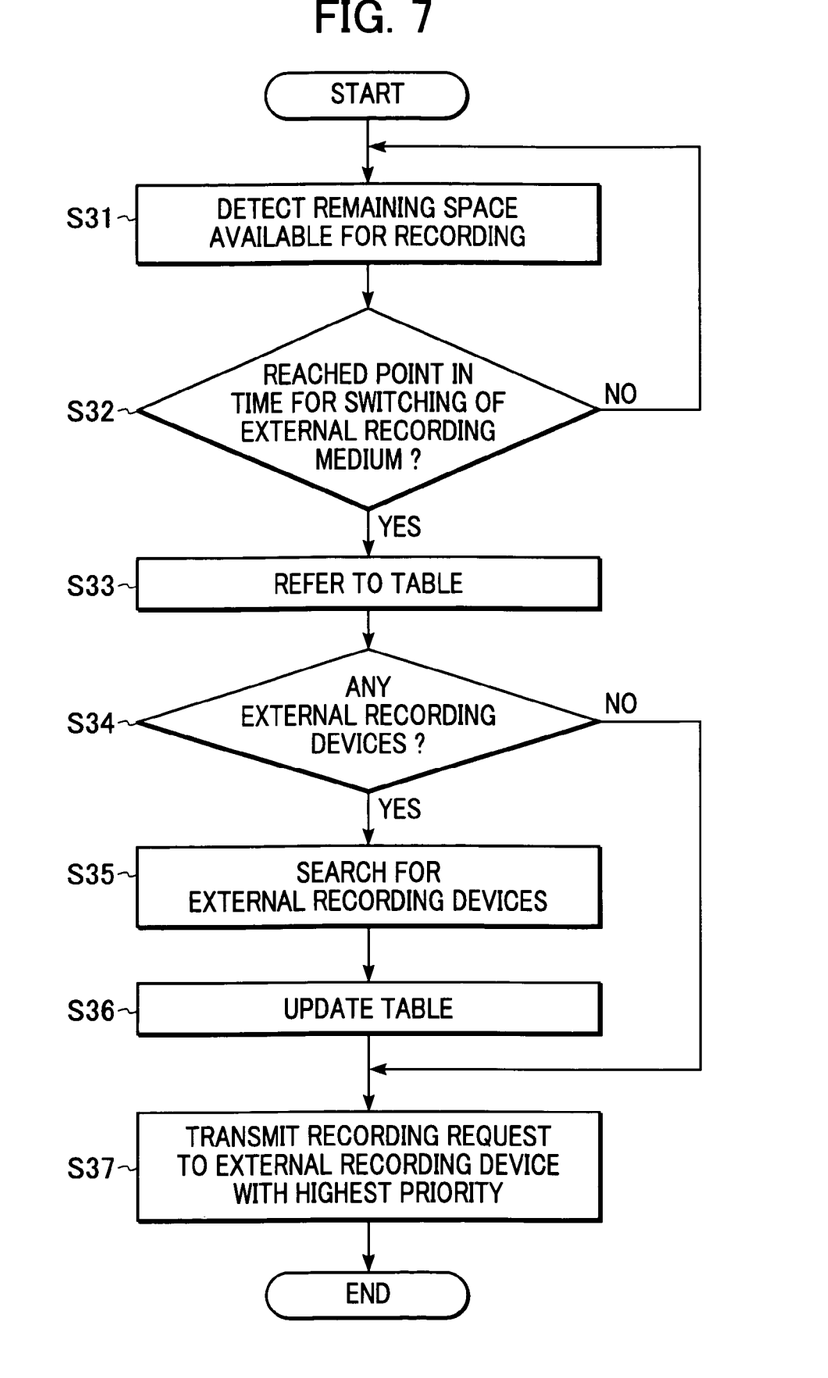
FIG. 7 is a flowchart for describing specific processing for switching of the recording medium from the internal recording medium to the recording medium included in the external recording device.

The system controller and the like shown in FIG. 6 are the same components as in FIG. 2. On the other hand, the external recording device is any one of the AVHDDs 304 through 306 shown in FIG. 1. The display unit 403 displays the taken images during recording of taken images on the internal tape 303. Note that the system controller 407 obtains the information regarding the state of the internal tape 303 at all times.

In the event that the remaining available recording time corresponding to the remaining tape length of the internal tape 303 reaches the sum of the response time of the external recording device with the highest priority registered in the table 50 and about ten seconds (Steps S31 and S32), the system controller 407 controls the display unit 403 to makes a display to notify the user that recording medium for recording the taken images is switched to recording medium in the external recording device (point T801).

In the event that the user confirms the display, and determines that the taken images should not be recorded on any recording medium other than the internal tape 303, the user makes a request to stop recording. In the event that the system controller 407 does not receive such a request, the system controller 407 refers the table 50 (Step S33), and issues to the external recording device a command for making a request for the start of recording of the taken images so that the remaining available recording time of the internal tape 303 includes the response time of the external recording device required for the start of recording (point T802, Steps S34 through S37).

In accordance with the external recording device receiving the request for the start of recording of the aforementioned taken images, the external recording device makes preparation for recording the taken images, and records the input taken images on the internal recording medium thereof.

On the other hand, at the time of the start of recording on the external recording device, the display unit 403 makes a display to notify the user that the recording medium for the taken images has been switched from the internal tape 303 to the external recording device (point T803). Note that the display on the display unit 403 is switched at the time of the recording device for the taken images having been actually switched from the internal tape 303 to the external recording device.

In some cases, the system controller 407 might not be able to obtain the precise remaining tape length of the internal tape 303, or the obtained response time of the external recording device required for the start of recording might contain some margin of error. In this case, the system controller determines the timing for issuing a command for the start of recording the taken images on the external recording device, with the maximal response time period of 30 seconds stipulated by the UPnP as the response time of the external recording device.

The time from the external recording device receiving the command up to the start of recording does not always match the response time obtained by the UPnP control unit 404. Accordingly, there is the need to determine the timing for issuing a command for making a request for the start of recording of the taken images, taking the remaining available recording time and some degree of irregularity in the response time into consideration.

With the first embodiment, the same taken images are recorded both on the last portion of the internal tape 303 and the beginning portion of the recording medium included in the external recording device, thereby enabling continuous recording of the images taken by the user in a sure manner. That is to say, this method prevents occurrence of unrecorded images in the images taken by the user, in a sure manner.

In this case, with the first embodiment, the timing of switching of recording medium is determined based upon the maximal response time for a command (30 seconds in UPnP). That is to say, in the event that the response time of the external recording device required for the start of recording, registered in the table 50, is less than 30 seconds, a series of processing for switching of recording medium is started 30 seconds before the point that the remaining available recording space of the internal tape 303 becomes zero.

On the other hand, in a case that the response time of the external recording device required for the start of recording, registered in the table 50, is equal to or greater than 30 seconds, in the event that the remaining available recording time reaches the sum of the response time of the external recording device registered in the table 50 and about five seconds, a series of processing for switching of recording medium is started. Thus, the recording medium for recording the taken images can be smoothly switched from the internal tape 303 to the recording medium of the external recording device.

Note that in the event that external recording devices are available for recording the taken images, and the system controller 407 can obtain the remaining available recording space or the remaining available recording time, for all the external recording devices, an arrangement may be made wherein the recording device for recording the taken images is switched from an external recording device to another external recording device.

In this case, in the event that external recording devices are connected on the UPnP network, the external recording devices are registered in the table 50 with the priorities thereof.

The system controller 407 calculates the remaining available recording time and the response time required for the start of recording in the order of the external recording device with the highest priority, and issues a command for making a request for the start of recording of the taken images to another external recording device selected by the system controller 407, whereby switching of the recording medium for recording taken images to a recording medium in another external recording device selected by the system is performed.

In some cases, any of the devices might be disconnected from the UPnP network. Accordingly, in the event that any device does not send periodic messages to the system controller 407, or in the event that the period of validity, described in the message, has expired, the system controller 407 is required to delete the registration of the external recording device from the table 50.

Accordingly, in some cases, there is the need to perform an operation for switching of recording within the term of validity described in the message after reception of the message. In the event that the external recording device, to which switching of the recording device is to be performed, has been disconnected from the UPnP network, switching of the recording device for recording taken images cannot be made. In this case, even in the event that the system controller 407 issues a command to the external recording device with the next priority, there might be unrecorded images, which have not been recorded in any recording medium.

Accordingly, in the event that external recording devices are connected on the UPnP network (Step S34), the system controller 407 is required to search the UPnP network for the external recording devices again, so as to update the table with regard to the external recording devices available for recording images, prior to the process for switching of the recording medium for recording taken images, (Steps S35 and S36).

In normal recording, switching of the recording medium for recording the taken images can be made with the above-described method. However, in the event that malfunctioning occurs in the internal tape 303 or the external recording device, switching of recording medium must be immediately performed for the taken images. Even in this case, there is the need to suppress unrecorded images to a minimum.

In the event that the table 50 regarding the external recording devices have been built, and the external recording devices are connected on the UPnP network, the system controller 407 issues a command for making a request for the start of recording of the taken images to the external recording device having the smallest response time required for the start of recording.

Furthermore, at the same time, the system controller 407 searches the UPnP network for the external recording devices. In the event that the system controller 407 detects a new external recording device which can start recording of the taken images with a response time shorter than with the external recording device registered in the table 50, the system controller 407 issues a command for making a request for the start of recording of the taken images to the aforementioned newly detected external recording device in the same way as described above.

In this case, recording of the same images is started on both of these two external recording devices. As a countermeasure, in the event that switching of recording medium of the taken images on the external recording device registered in the table 50 at the time of occurrence of malfunctioning has been successfully performed, recording of the taken images on the newly detected external recording device is stopped. Subsequently, the system controller 407 issues a command to the newly detected external recording device for the recording position thereof to return to the position corresponding to the beginning of the aforementioned recorded images.

Furthermore, in the event that the system controller 407 can delete the images recorded on the aforementioned newly detected external recording device, the system controller 407 issues a command to the aforementioned newly detected external recording device for deleting the images recorded thereon which have also been recorded on another external recording device. Subsequently, the system controller 407 searches the UPnP network for the external recording devices again, so as to update the table 50 for the next switching of recording medium.

On the other hand, in the event that malfunctioning is eliminated, and the internal tape 303 becomes available for recording, switching of recording medium for recording the taken images is made from the recording medium included in the external recording device to the internal tape 303, and the table 50 is updated regarding the external recording devices with the updated priorities.

As described above, with the first embodiment, in the event that the remaining recording space of the internal tape 303 becomes smaller than a predetermined value during recording the taken images on the internal tape 303 included in the DVC 301, the system controller 407 issues a command for recording the taken image to the AVHDD (external recording device) so that switching of the recording medium for recording the taken images is performed from the internal tape 303 to any of the AVHDDs (external recording devices) 304 through 306. That is to say, in the event that the remaining recording space of the internal tape 303 becomes smaller than the predetermined value, switching of the recording medium for recording the taken images can be automatically performed. Thus, in the event that the remaining recording space of the internal tape 303 becomes small, switching of the recording medium for recording the taken images can be easily performed in a sure manner.

On the other hand, with the first embodiment, in the event that a problem occurs that recording of the same taken images is started on both the two external recording devices, the system controller 407 issues, to the external recording device which has not been registered in the table 50 at the time of occurrence of malfunctioning, a command for stopping recording of the taken images, a command for the recording position thereof to return to the position corresponding to the beginning of the aforementioned recorded images, and further issues a command for deleting the aforementioned recorded images which have been also recorded on another recording medium, thereby preventing the same images from being recorded on the two recording devices.

Furthermore, the system controller 407 obtains the available recording space of each external recording device, registers the information in the table 50, and determines the recording device for recording the taken image based upon the information registered in the table 50, and thus, recording of the taken images can be performed for a long time, and furthermore, the number of times of switching of recording medium of the taken images can be reduced to a minimum.

Furthermore, the system controller 407 obtains the response time of each external recording device required for the start of recording (response time), registers the information in the table 50, and determines the recording device for recording the taken image based upon the information registered in the table 50, and thus, in the event that malfunctioning occurs in the recording device during recording of the taken images, the system controller 407 selects an external recording device having the minimal response time based upon the table 50 so as to perform switching of recording medium of the taken images as quickly as possible. Thus, the system controller 407 can suppress occurrence of unrecorded images due to malfunctioning of the recording device or the error of the user, to a minimum.

While a method is preferably employed as with the first embodiment wherein the system controller 407 issues a command to the external recording device for the start of recording within the remaining available recording time of the internal tape 303 so that the same images are recorded on the last portion of the internal tape 303 and the beginning portion of the external recording device, thereby enabling continuous recording of the images taken by the user in a sure manner, an arrangement may be made wherein the external recording device starts recording of the taken images at the time of the remaining recording time of the internal tape 303 becoming zero.

Note that while in the first embodiment, description has been made only regarding images, and description regarding audio has been omitted, an arrangement may be made wherein switching of recording medium of audio is performed in the same way. The digital interface employed in the present invention is not restricted to an IEEE 1394 interface, but rather, any interface may be employed as long as synchronous communication of image data and audio data can be performed using the interface.

Second Embodiment

The present invention encompasses an arrangement wherein software program codes are provided to a computer within an apparatus or a system connected to the above-described devices so as to operate the devices and effect the functioning in the same way as with the above-described first embodiment according to the program stored in the computer (CPU or MPU) of the system or the apparatus.

In this case, the aforementioned software program codes effect the functioning in the above-described first embodiment, and the program codes, and means for providing the program codes to a computer, e.g., a recording medium storing the program codes, are included in the present invention. As a recording medium for storing the program codes, a flexible disk, hard disk, optical disk, magneto-optical disk, CD-ROM, magnetic tape, non-volatile memory card, ROM, or the like, may be employed, for example.

Furthermore, it is needless to say that the program codes are included in the present invention, not only in a case of an arrangement wherein a computer effects the functioning in the same way as with the above-described embodiment by executing the provided program codes, but also in a case of an arrangement wherein the program codes effect the functioning in the same way as with the above-described embodiment in cooperation with an OS (operating system) operating on the computer, application software other than the OS, or the like.

Furthermore, it is needless to say that an arrangement is included in the present invention wherein provided program codes are stored in memory included in a function expansion board of a computer or a function expansion unit connected to the computer, following which a CPU or the like included in the function expansion board or the function expansion unit executes a part of or all of the actual processing according to the instructions from the program codes so as to effect the functioning in the same way as with the above-described embodiment.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An imaging apparatus comprising:
   a recording unit which records taken images on a first recording medium;
   a display unit which displays the taken images;
   a first detecting unit which detects the remaining available recording space of the first recording medium;
   a second detecting unit which detects a plurality of external recording devices from a network; and
   a control unit which (a) determines a priority among the plurality of external recording devices, (b) automatically selects one of the plurality of external recording devices in accordance with the determined priority among the plurality of external recording devices, and (©) changes a recording medium for the taken images from the first recording medium to the selected external recording device so as to record the taken images on a second recording medium by the selected external recording device,
   wherein said display unit displays that a recording medium for the taken images has been changed from the first recording medium to the selected external recording device, if the selected external recording device starts recording of the taken images.

2. An imaging apparatus according to claim 1, wherein said second detecting unit detects the plurality of external recording devices using Universal Plug and Play.

3. An imaging apparatus according to claim 1, wherein said imaging apparatus includes a digital video camera.

4. An imaging apparatus according to claim 1, wherein said imaging apparatus includes a digital video camera, and wherein said second detecting unit detects the plurality of external recording devices using Universal Plug and Play.

5. An imaging apparatus according to claim 1, wherein said control unit changes a recording medium for the taken images from the first recording medium to the selected external recording device so as to record the taken images on the second recording medium by the selected external recording device, if the remaining available recording space of the first recording medium reaches a predetermined value.

6. An imaging apparatus according to claim 1, wherein said second detecting unit detects remaining available recording spaces of the plurality of external recording devices from the network, and wherein said control unit determines the priority among the plurality of external recording devices in accordance with the remaining available recording spaces of the plurality of external recording devices detected by said second detecting unit.

7. An imaging apparatus according to claim 1, wherein said second detecting unit detects response times of the plurality of external recording devices from the network, and wherein said control unit determines the priority among the plurality of external recording devices in accordance with the response times of the plurality of external recording devices detected by said second detecting unit.

* * * * *

UNITED STATES PATENT AND TRADEMARK OFFICE
CERTIFICATE OF CORRECTION

PATENT NO. : 7,379,102 B2
APPLICATION NO. : 10/726603
DATED : May 27, 2008
INVENTOR(S) : Satoshi Nakama It is certified that error appears in the above-identified patent and that said Letters Patent is hereby corrected as shown below:

ON THE TITLE PAGE, AT (57), ABSTRACT
Line 11, "©)" should read --(c)--.

COLUMN 4
Line 24, "starts" should read --start--.

COLUMN 5
Line 58, "makes" should read --make--.

COLUMN 10
Line 45, "©)" should read --(c)--.

Signed and Sealed this

Second Day of December, 2008

JON W. DUDAS
*Director of the United States Patent and Trademark Office*